(12) United States Patent
Mihm et al.

(10) Patent No.: US 11,168,794 B2
(45) Date of Patent: Nov. 9, 2021

(54) DOUBLE SEAL LUBRICATED PACKING GLAND AND ROTATING SLEEVE

(71) Applicant: Viking Pump, Inc., Cedar Falls, IA (US)

(72) Inventors: Christopher Mihm, Denver, IA (US); John Hall, Cedar Falls, IA (US); Andrew Anderson, Waterloo, IA (US); Michael R. Crawford, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 102 days.

(21) Appl. No.: 16/444,644

(22) Filed: Jun. 18, 2019

(65) Prior Publication Data

US 2019/0383399 A1    Dec. 19, 2019

Related U.S. Application Data

(60) Provisional application No. 62/686,257, filed on Jun. 18, 2018, provisional application No. 62/843,665, filed on May 6, 2019.

(51) Int. Cl.
*F16J 15/40* (2006.01)
*F16J 15/34* (2006.01)
(Continued)

(52) U.S. Cl.
CPC ......... *F16J 15/406* (2013.01); *F16J 15/3484* (2013.01); *F16J 15/54* (2013.01); *F16J 15/3232* (2013.01)

(58) Field of Classification Search
CPC ........ F16J 15/34; F16J 15/406; F16J 15/3484; F16J 15/54; F16J 15/3232
See application file for complete search history.

(56) References Cited

U.S. PATENT DOCUMENTS 4,560,173 A * 12/1985 Adams .................. F16J 15/162
                                                        277/367
6,834,574 B2 * 12/2004 Neumann ........... F15B 15/2846
                                                        91/1

(Continued)

FOREIGN PATENT DOCUMENTS

CN    206 889 325 U     1/2018
GB        596 538 A     1/1948
WO    2017202592 A1    11/2017

OTHER PUBLICATIONS

PCT International Search Report and Written Opinion from the International Application, PCT/US/2019/037720, dated Aug. 29, 2019, 16 pages.

*Primary Examiner* — Gilbert Y Lee
(74) *Attorney, Agent, or Firm* — Tucker Ellis LLP; Michael G. Craig; Heather M. Barnes

(57) ABSTRACT

One or more techniques and/or systems are disclosed for mitigating fluid loss or leakage from a fluid pump with a rotating shaft driving a pumping mechanism. A packing gland component can have an internal seal formed by two dynamic O-rings that allows for use of lubricants at high pressures, as well as an outer seal for greater prevention of fluid loss. Further, the packing gland component can be a retrofit for existing packing gland components to provide for greater life and efficiency as compared to the existing packing gland components. Additionally, in some implementations, a sleeve may be fixedly attached to the rotating shaft between the packing gland and the shaft to provide a wear point for the packing gland.

18 Claims, 15 Drawing Sheets

(51) Int. Cl.
*F16J 15/54* (2006.01)
*F16J 15/3232* (2016.01)

(56) References Cited

U.S. PATENT DOCUMENTS

| | | | |
|---|---|---|---|
| 7,552,671 B2 * | 6/2009 | Neumann | G01D 5/34761 91/1 |
| 2002/0197151 A1 | 12/2002 | Rockwood | |
| 2018/0100583 A1 | 4/2018 | Iehl et al. | |
| 2019/0145521 A1 * | 5/2019 | Vainikainen | F16J 15/3404 277/367 |

* cited by examiner

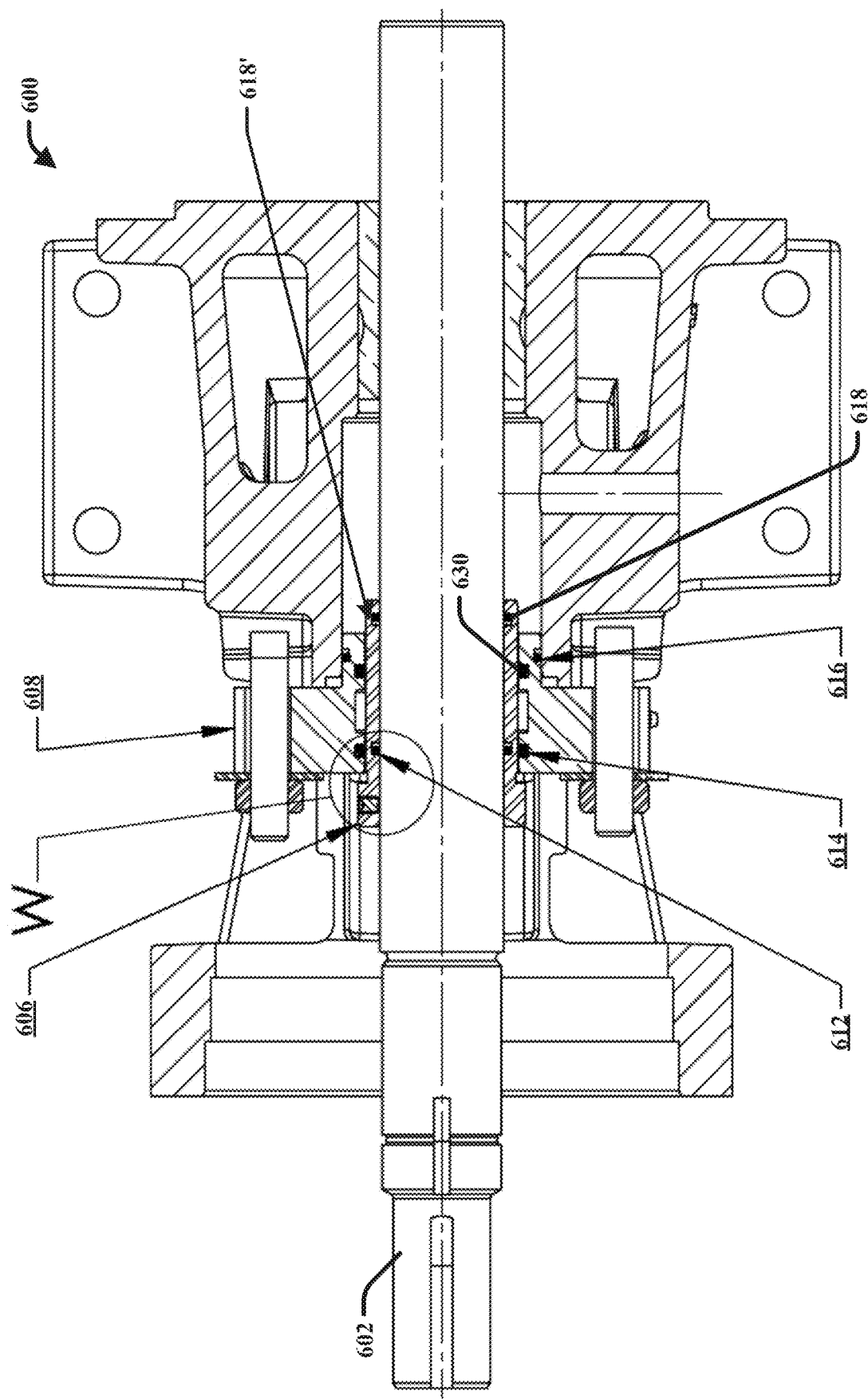

SECTION B-B

DOUBLE SEAL LUBRICATED PACKING GLAND AND ROTATING SLEEVE

CROSS-REFERENCE TO RELATED APPLICATIONS

This application claims priority to U.S. Provisional Patent Application Ser. No. 62/686,257, entitled DOUBLE SEAL LUBRICATED PACKING GLAND, filed Jun. 18, 2018, and to U.S. Provisional Patent Application Ser. No. 62/843,665, entitled SEAL GLAND AND ROTATING SLEEVE, filed May 6, 2019, both of which are incorporated herein by reference.

BACKGROUND

Fluid pumps used in a variety of settings often utilize a packing seal system, which can comprise packing material and a packing gland, to mitigate loss of the transported fluid from the fluid transport system. These sealing systems are typically implemented along a rotating shaft used to drive the pumping component. For example, packing material can be compressed against a back seat, on a rotating shaft, by the packing gland and follower components. Often, a separate bushing component may be disposed on the shaft, between the packing gland and packing material. In this way, for example, the compressed packing material, along with a pressurized lubricant and bushing, can help mitigate fluid loss along the shaft.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to help mitigate fluid loss or leakage from a fluid pump with a rotating shaft driving a pumping mechanism, such as in a gear pump, for example. In one implementation, a packing gland component may be formed with two inner channels for two dynamic O-rings and one outer channel for one static O-ring. The packing gland component may have an inner groove with an inlet and outlet port for fluid lubrication at high pressures. In this example, the packing gland component can have a dynamic seal against the rotating shaft, formed by the two dynamic O-rings, and yet another seal formed by the outer static O-ring.

Further, one or more techniques and systems described herein can be utilized to help mitigate wear of a pump shaft of a rotating pump. A sleeve may be introduced between a packing seal gland (a.k.a. a packing gland) and rotating shaft of the pump. The sleeve can be operably, fixedly engaged with the shaft, and rotate with the shaft inside the packing seal gland. In this implementation, the shaft and packing seal gland combination can also mitigate fluid loss or leakage from a fluid pump with a rotating shaft driving a pumping mechanism. Additionally, the sleeve and packing seal gland components may be formed with channels for static and dynamic O-rings. In this way, for example, the sleeve can act as a wear point between the packing seal gland and shaft, and may be more easily replaced, at less cost, than replacing the shaft.

In one implementation, the packing gland may be formed as a retrofit for the existing design packing gland. As a retrofit, the packing gland component may easily replace existing components in less time and with less effort than required for a one-piece, combination packing gland and bushing component, and can also provide improvements over the current design packing gland component. For example, the packing gland component weighs less that a one-piece, combination packing gland and bushing component, and more easily replaces current packing gland components. As another example, the packing gland component can reduce manufacturing costs over the one-piece combination design by eliminating the bushing from the design, by utilizing existing pump shaft support methods, and by providing a longer life for the packing gland component. Further, the packing gland component will allow convenient access for lubrication of the dynamic O-rings through the inlet and outlet ports of the packing gland to increase the life of the dynamic O-rings.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 6A and 6B are component diagrams illustrating a side view and cut-away view of an example pump.

DETAILED DESCRIPTION

Figure 1A:
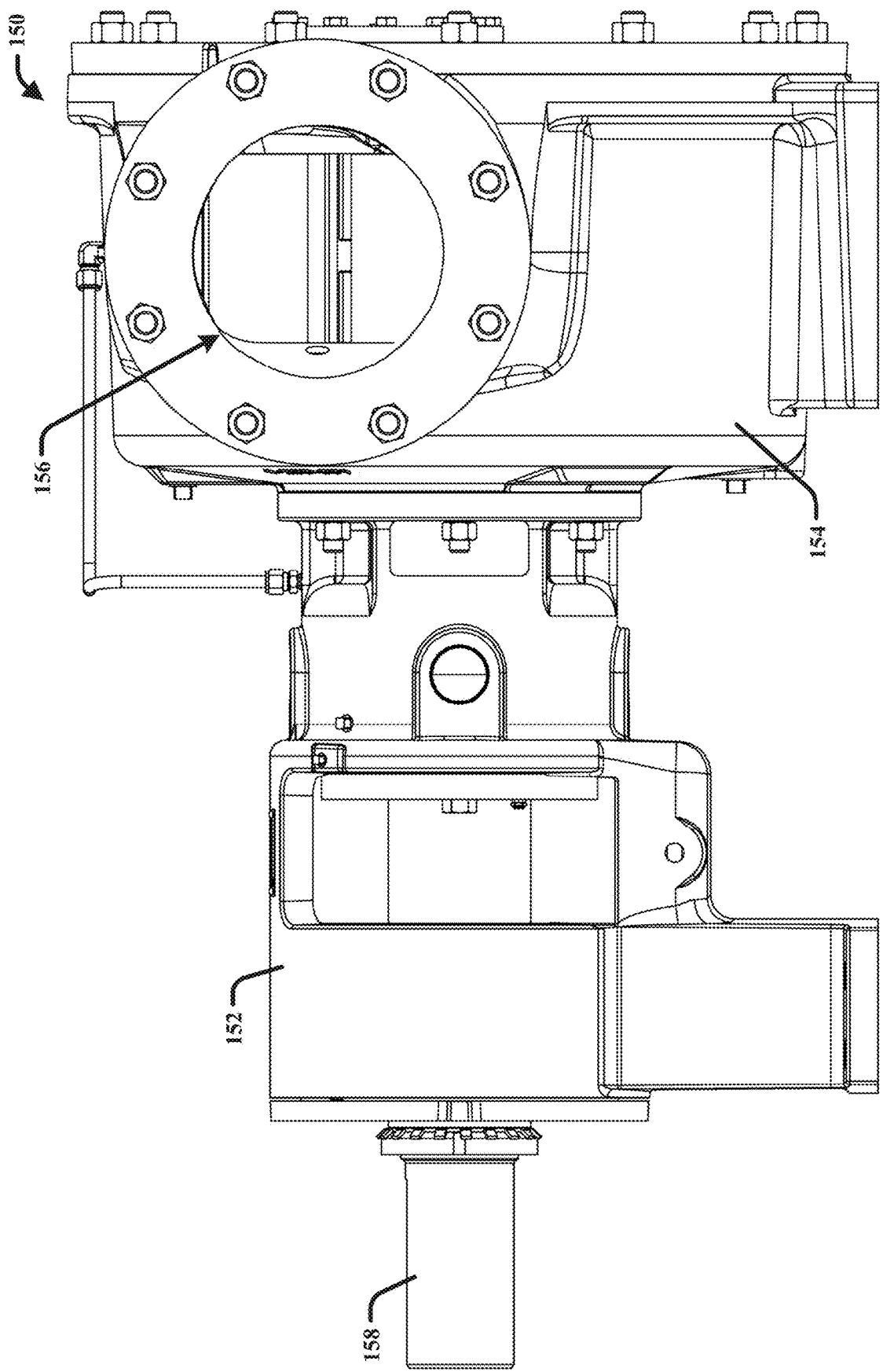
FIGS. 1A and 1B are component diagrams illustrating an example pump where one or more portions of the innovative system, described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As an example, pumps can be coupled to a motor, engine, or other power supply by a shaft that transfers rotation power to the pump. The motor typically rotates the shaft, which, in turn, rotates a pump rotor in a pumping chamber to move fluids through conduits coupled to the pump. However, the location at which the rotating pump shaft enters the pumping chamber, comprising the pump rotor, provides a location where leakage of the pumped fluid from the pump chamber may occur. In one aspect, a system may be devised for sealing a rotating pump shaft entrance to the pumping chamber. In one implementation, the pump can comprise a pump bracket, which comprises a shaft casing (e.g., or pump shaft packing box, or the like) disposed proximally (e.g., proximally to the motor in relation to the connection of the pump to the motor) from the entrance of the pump shaft to the pump chamber. In this implementation, at least a portion of the pump shaft is disposed inside the pump shaft casing.

In one implementation, an innovative pump shaft seal carrier can be used, to hold one or more seals (e.g., gaskets, O-rings) between the seal carrier and a rotating shaft, and the seal carrier and the bracket (e.g., comprising the shaft casing) holding the packing gland. In this implementation, the seal carrier can be configured to hold one or more dynamic seals, such as O-rings, that form a seal on the rotating shaft of the pump. That is, for example, the seals are dynamic because they create a seal to mitigate fluid leakage between the seal carrier and a moving object (e.g., the rotating shaft). Further, in one implementation, a groove, channel, or via on the inside diameter of the seal carrier can comprise an inlet port and outlet port for flow of a lubricating fluid to provide lubrication to the dynamic seals.

Additionally, in one implementation, the seal carrier can be configured to hold one or more static seals on the outside perimeter of the seal carrier (e.g., packing gland), to form a static seal between the packing gland and the bracket or casing housing the shaft. As an example, one or more of these innovations can provide an advantage by reducing cost and weight of the current and existing designs of the seal bushings for pumps. These innovations may also eliminate the need for bushing from the component, and utilize existing shaft support techniques found in some pumps.

Figure 1B:
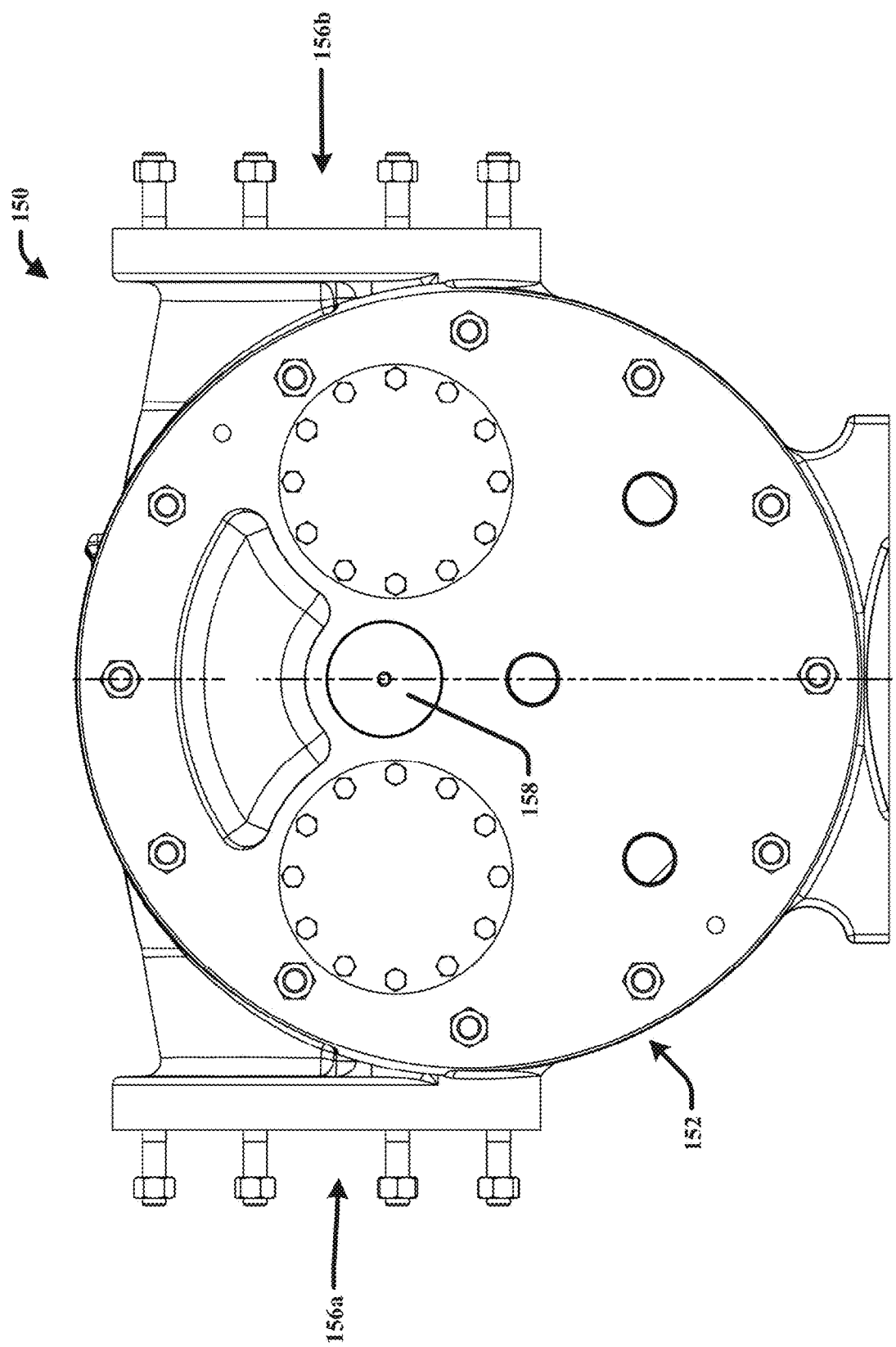

FIGS. 1A and 1B are component diagrams illustrating an example pump 150, where one or more portions of the innovative system, described herein may be implemented. FIG. 1A is a side view of the example pump 150, and FIG. 1B is a front view of the example pump 150. In this example, the pump 150 comprises a pump bracket 152. A pump bracket 152 can be selectably engaged with the pump's pumping chamber casing 154. Further, the example pump 150 can comprise a pump shaft 158, and pump ports 156, such as an inlet port 156a and an outlet port 156b (e.g., or vis versa, as the pump may run clockwise or counter clockwise, depending on configuration).

As an example, the pump bracket 152 can house bearings, bushings, packing material, and seals that may be used in the pump 150 to help support the pump shaft 158, improve rotation efficiency of the shaft 158 and life of the pump 150, and mitigate leakage of pumped fluid. Further, the pumping chamber casing 154 can house a pumping chamber, for example, where fluid can be pumped between the inlet and outlet ports 156. As an example, the rotation of the pump shaft 158 can be used to rotate pump vanes inside the pumping chamber, to move the fluid from one side of the pump to the other. Additionally, for example, conduits (e.g., piping) can be engaged with the respective ports 156 to pump fluid from one location to another.

Figure 2:
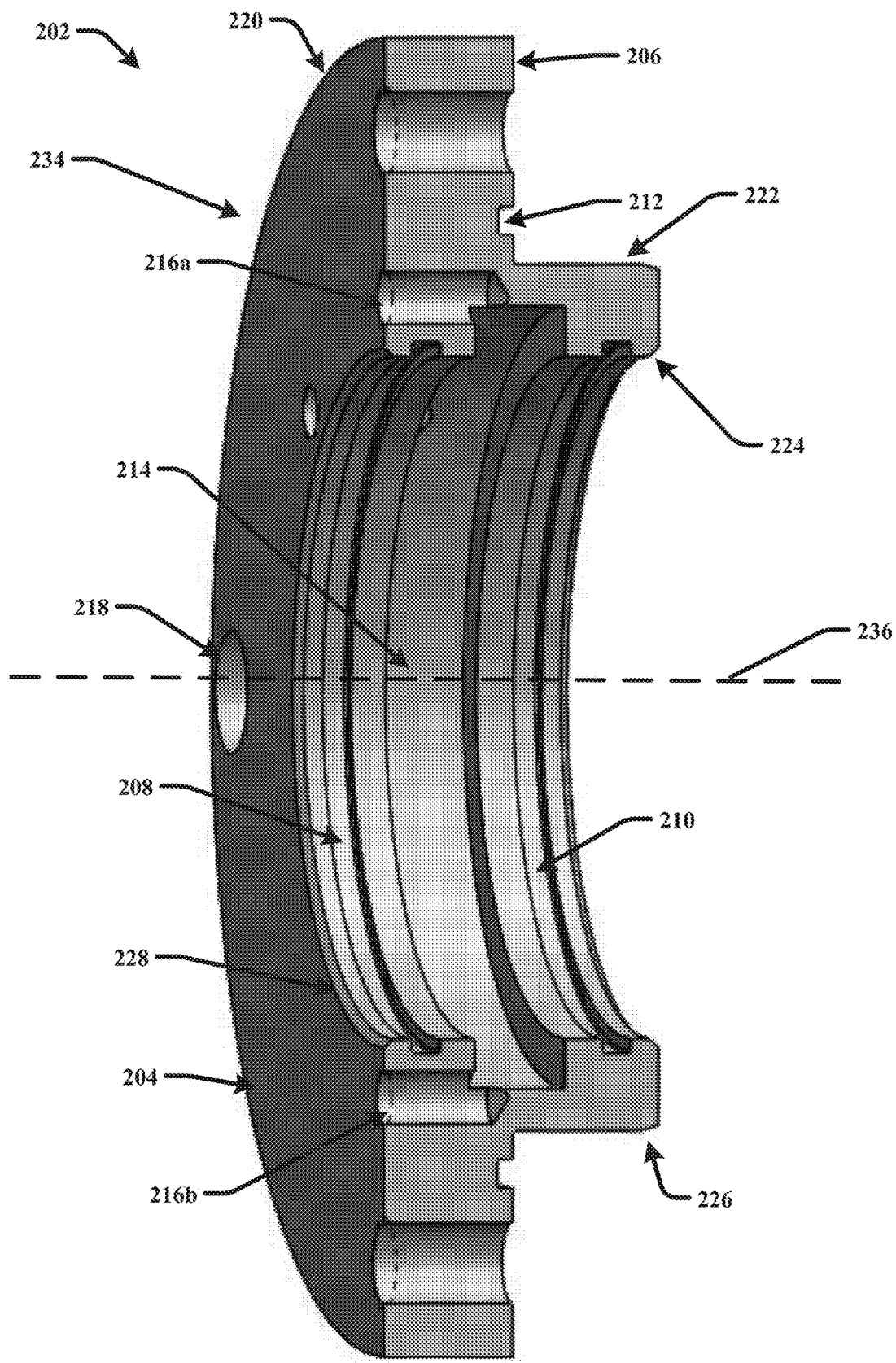
FIG. 2 is a component diagram illustrating a cut-away view of an example implementation of one or more portions of one or more systems described herein.

FIG. 2 is a component diagram illustrating one implementation of an example packing gland or seal carrier 202 that can be implemented in a system for mitigating leakage of a pumped fluid in a pump (e.g., pump 150 of FIGS. 1A, 1B). In this implementation, the example packing gland 202 can comprise a body 234 that comprises a tube portion 222 and a shoulder portion 220. That is, for example, the packing gland 202 comprises a one-piece body 234 made up of the tube portion 222 and the shoulder portion 220. As an example, the body 234 may be formed as a one-piece member, or may be constructed as separate pieces that are secured together (e.g., welded, soldered, glued, or otherwise fixedly engaged).

In the example packing gland 202, the tube portion 222 extends along a central axis 236, and comprises an inner diameter that is configured to receive a rotating shaft of a pump, and an external diameter that is configured to fit inside a packing box of the pump. That is, for example the tube portion 222 can fit inside the packing box of a pump shaft casing, and the pump shaft can fit inside the tube portion 222. Further, the shoulder portion 220 extends perpendicular to the central axis 236 at a proximal end 204 of the body 234, and is configured to be disposed external to the proximal end of the packing box of the pump. That is, for example, the tube portion 222 can be inserted into the packing box of the pump, and the shoulder portion can remain on the outside of the packing box, engaged with a proximal face of the shaft casing. In this way, the shoulder portion 220 provides a stop when the packing gland is inserted into the packing box of the pump.

The packing gland 202 can comprise a first channel or first dynamic seal channel 208 disposed inside the shoulder portion 222 at the proximal end 204. The first channel 208 can be configured to house a first gasket, such as an O-ring, that provides a seal between the packing gland 202 and the rotating shaft of the pump. The first seal is considered dynamic as it is in contact with the rotating shaft during operation to provide a seal to mitigate leakage of pumped fluid along the shaft. The example packing gland 202 can comprise a second channel or second dynamic seal channel 210 disposed distally from the first channel 208 inside the tube portion 222. The second channel 210 can be configured to house a second gasket, such as an O-ring, that provides a seal between the packing gland 202 and the rotating shaft of the pump. The second seal is also considered dynamic as it is in contact with the rotating shaft during operation to provide an additional seal to mitigate leakage of pumped fluid along the shaft.

Further, the packing gland 202 can comprise a third channel 214 disposed between the first channel and the second channel inside the tube portion 222. The third channel 214 is in fluid communication with a lubrication inlet port 216a and lubrication outlet port 216b. In this example, the respective ports 216 are in fluid communication with the third channel 214 to operably receive lubrication fluid through the lubrication inlet port 216a such that the third channel 214 acts as a reservoir for lubricating fluid, to lubricate the contact between the shaft and the first gasket and the shaft and the second gasket. That is, for example, lubricating fluid can be introduced through the lubrication inlet port 216a and into the third channel 214, at least until a sufficient amount of lubrication fluid is disposed in the third channel 214. For example, the lubricating channel 214 may be filled with lubricating fluid at least until a desired pressure is reached in the third channel 214, such that the lubricating fluid migrates to the gaskets to provide lubrication during operation.

In FIG. 2, the example packing gland 202 comprises a fourth channel 212, or static seal channel, disposed on a distal side 206 of the shoulder portion 220. The fourth channel 212 can be configured to house a third gasket, such that the third gasket is operably in contact with the shaft casing of the pump to which the packing gland is fixedly coupled, in order to mitigate pumped fluid leakage along the outside of packing gland 202.

The example packing gland 202 can comprise two or more fastener receivers 218 disposed in the shoulder portion 220. The fastener receivers 218 can be configured to respectively receive a fastener that is used to selectably fasten the packing gland 202 to the shaft casing of the pump. That is, in operation, the packing gland can be fastened to the shaft casing of the pump, with the rotating shaft disposed through the tube portion 222 of the packing gland 202.

In one implementation, as illustrated in FIG. 2, the packing gland 202 can comprise a first chamfer 224. The first chamfer 224 is disposed at the proximal end of the tube portion 222, and can facilitate insertion of the pump shaft into tube portion 222. Further, the packing gland 202 can comprise a second chamfer 226. The second chamfer 226 is disposed at the distal end of an external side of the tube portion, and can facilitate insertion of the tube portion 222 into the packing box of the pump. Additionally, the packing gland 202 can comprise a third chamfer 228. The third chamfer 228 is disposed at the distal end of an internal side of the tube portion, and can facilitate insertion of the pump shaft into tube portion 222.

Figure 3:
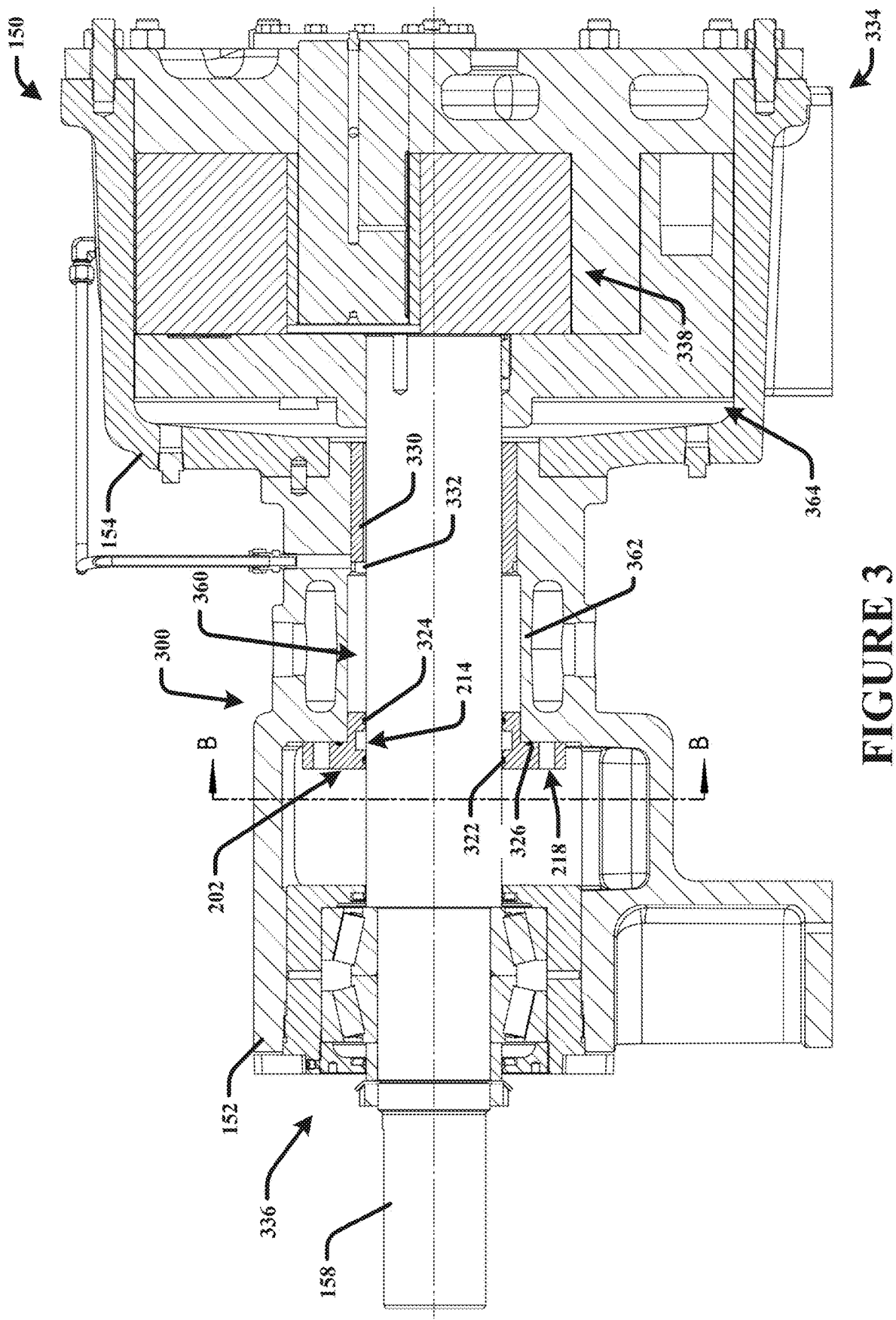
FIGS. 3 and 4 are component diagrams illustrating and example implementation of a system for mitigating leakage of pumped fluid from a pump.
Figure 4:
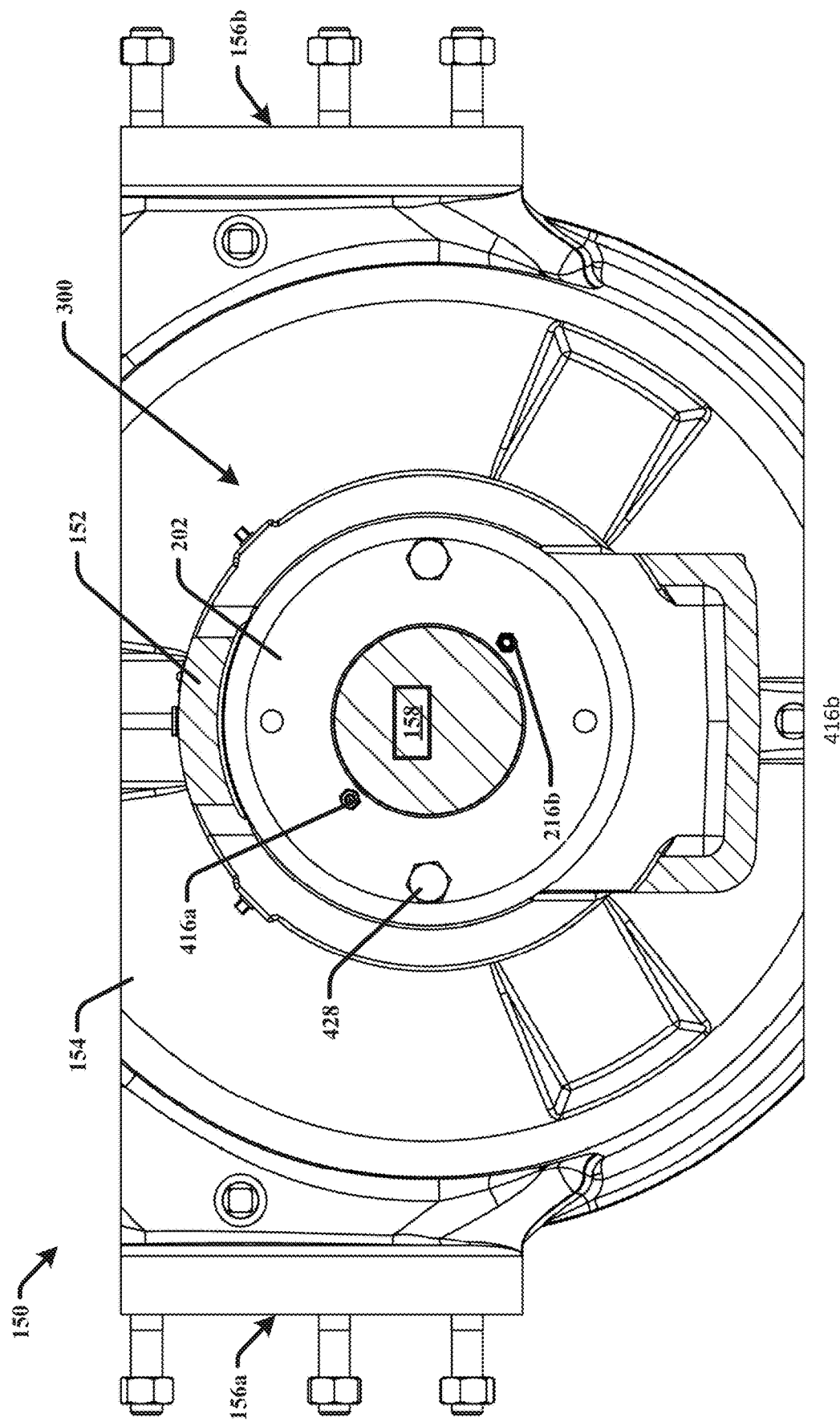

FIGS. 3 and 4 are component diagrams that illustrate one implementation of an example system 300 for sealing a rotating pump shaft in a pump 150. FIG. 3 is a cut-away, side view of an example pump 150, where the example system 300 can be implemented. FIG. 4 is a rear cutaway view of a portion of a pump 150, such as along the B-B line in FIG. 3, where one or more portions of the example system 300 can be implemented. In this implementation, the example pump 150 comprises a pumping chamber 364 that is disposed inside the pump chamber casing 154. The pump chamber 364 is disposed at a distal end 334 of the pump 150, and it comprises rotating vanes 338. A pump shaft 158 is engaged with the rotating vanes 338 to transfer rotation power from an engine (not shown) to the vanes 338.

Further, in this implementation, the example pump 150 comprises a shaft casing 362. In some implementations, the shaft casing 362 can comprise part of the pump bracket 152, which may be operably coupled to the pump chamber casing 154 and pumping chamber 364. The shaft casing 362 can comprise a packing box 360, which is disposed on the inside of the shaft casing 362. The packing box 360 can be sized and shaped to house a portion of the pump shaft 158, adjacent to the pumping chamber 364. Further, in some implementations, the packing box 360 (e.g., the internal portion of the shaft casing 362) can be sized and shaped to house packing material (described below), and/or a bushing (described below).

A one-piece packing gland 202 can comprise a body 234. The body can comprise the tube portion 222 and the shoulder portion 220. As illustrated in FIG. 3, the tube portion 222 extends into the packing box 360 that is surrounding the shaft 158; and the shoulder portion 220 is disposed externally to the proximal end 336 of the packing box 362. The packing gland 202 can comprise a first channel, or first dynamic seal channel, 208 that is disposed inside the shoulder portion 220 at the proximal end 336. The first channel 208 houses a first, proximal, dynamic seal gasket 322 that is operably in contact with the rotating shaft 158 to mitigate pumped fluid leakage along the shaft 158. Further, a second channel, or second dynamic seal channel, 210 is disposed distally from the first channel 208 inside the tube portion 222. The second channel 210 houses a second, distal, dynamic seal gasket 324 that is operably in contact with the rotating shaft 158 to mitigate pumped fluid leakage along the shaft 158.

In this implementation, a third channel 214 is disposed between the first channel 208 and the second channel 210 in the tube portion 222. The third channel 214 is in fluid communication with the lubrication inlet port 216a, such that the third channel operably receives lubrication fluid through the lubrication inlet port 216a to lubricate the contact between the shaft 158 and the first gasket 322 and the shaft 158 and the second gasket 324. For example, in one implementation, as illustrated in FIG. 4, a lubrication fitting 416a can be operably engaged with the lubrication inlet port 216a to allow lubrication fluid to be injected into the inlet port 216a, and into the third channel 214. For example, during operation or the pump, the shaft 158 is rotating around the central axis 236 to provide power to the vanes 338. In this example, the dynamic seals 322, 324 are in contact with the rotating shaft, and the lubrication fluid in the pressurized third channel 214 can provide lubrication for the dynamic seals 322, 324 against the rotating shaft 158. In this example, fluid lubrication may be provided to the dynamic O-rings to ensure longer life of the O-rings and easier maintenance of the system 300.

Further, in one implementation, an indicator fitting 416b can be operably engaged with the outlet port 216b, to provide an indication of a change in pressure in the third channel 214, which is indicative of damage to one or more of the first gasket 322 and second gasket 324. For example, when the third channel 214 is under pressure from the injected lubrication fluid the indicator fitting may indicate a first condition (e.g., normal operation), and when the third channel 214 is not under operation pressure, such as due to a seal leak from the first or second gasket 322, 324, the indicator fitting may indicate a second condition that is visible to an operator of the pump 150. In this way, the operator may identify when a gasket should be replaced. As an example, the operator may selectably unfasten the packing gland 202 from the shaft casing 362, replace the damaged seal, and reinstall the packing gland 202 to the shaft casing 362.

As illustrated in FIG. 4, the packing gland 202 can be selectably, operably fastened to the shaft casing 362. For example, a packing gland fastener 428 can be inserted into a fastener receiver 218 in the shoulder portion 220 of the packing gland 202, and fastened to a corresponding portion of the shaft casing 362 (e.g., portion of the bracket 152). In one implementation, packing material can be disposed in the packing box 360, distally from the packing gland 202, and the packing gland 202 can subsequently be fastened to the shaft casing 362. In this way, for example, the packing material can help mitigate leakage of pumped fluid from the pumping chamber 364, along the shaft 158. Further, in this example, fastening the packing gland 202 to the shaft casing 362 can compress the packing material to provide a better seal along the shaft 158.

In one implementation of the example system 300, the packing gland can comprise a fourth channel disposed on a distal side of the shoulder portion, the fourth channel, or static seal channel 212. The fourth channel 212 houses a third gasket 326, such as an O-ring, which provides a seal between the outside of the packing gland 202 and the proximal end of the shaft casing 362. In this way, the third gasket 326 seal can mitigate pumped fluid leakage along the outside of the packing gland 202.

In one implementation, the example pump can comprise a bushing 330 that is disposed between the shaft 158 and the shaft casing 362, distally from the packing gland 202. The bushing 330 can support the rotating shaft 158 during operation. Further, in some implementations, the bushing 330 can comprise a bushing lubrication port 332 to receive lubricating fluid at the shaft 158 during operation. That is, in one example, as illustrated, the lubrication fluid may comprise pumped fluid that is circulated to the bushing lubrication port 332 using a conduit.

In one implementation, the example pump can comprise a bearing assembly 336. The bearing assembly can be disposed in contact with the shaft 158, proximally from the packing gland 202, to provide support to the shaft 158 during operation. That is, for example, the combination of the bearing assembly 336 and the bushing 330 can help support the shaft 158 during rotation, particularly under load (e.g., pumping of fluid), to mitigate vibration or off-center rotation around the central axis 236.

Figure 5:
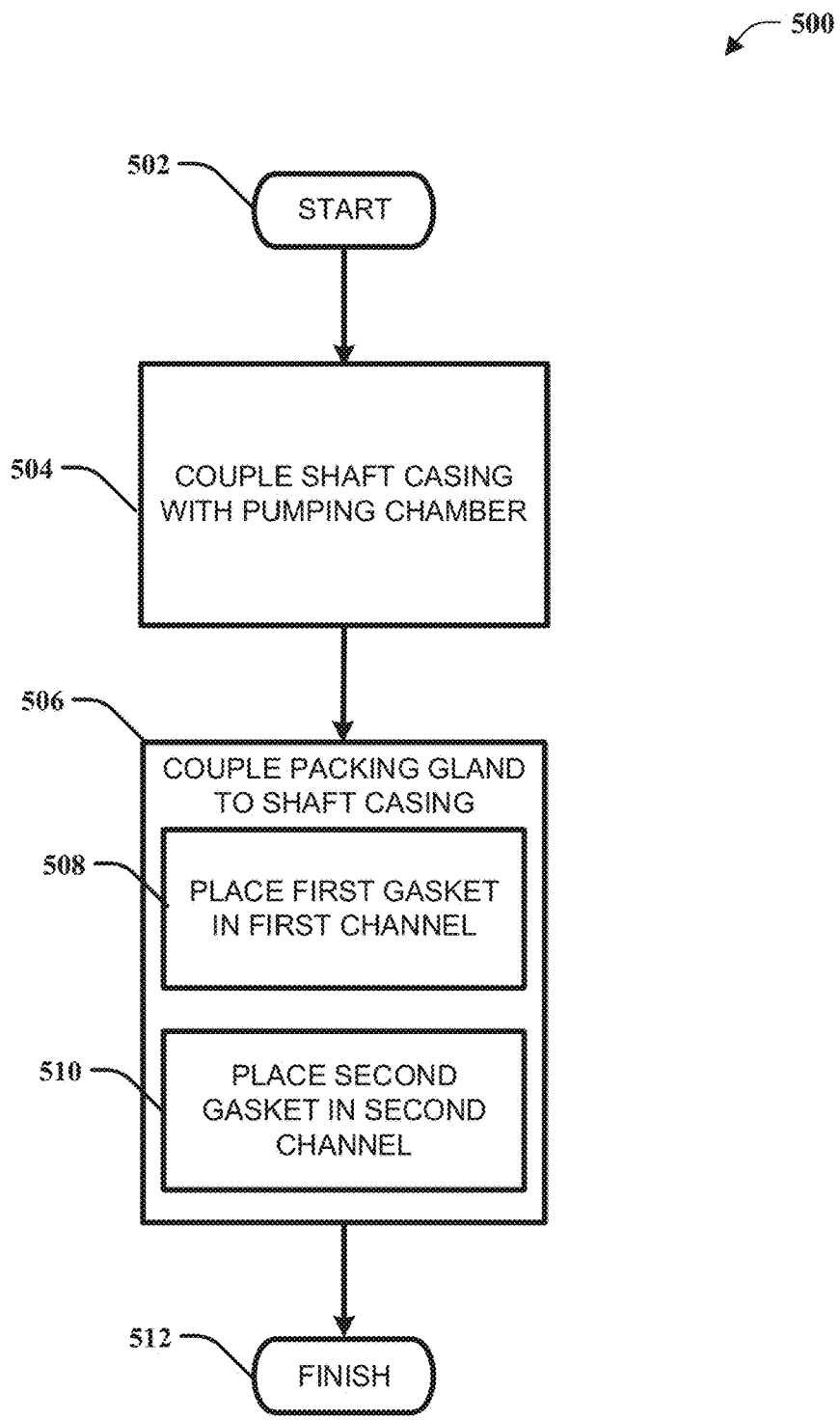
FIG. 5 is a flow diagram illustrating an example method for making a pump.

In one aspect, a method for making a pump, comprising one or more portions of the systems described herein, may be devised. FIG. 5 is a flow diagram illustrating an example method 500 for making a pump. The example method 500 begins at 502. At 504, a shaft casing can be coupled with a pumping chamber. In this method 500, the pumping chamber can be disposed at a distal end of the pump, and the pumping chamber can comprise rotating vanes. Further, the shaft casing can comprise a packing box that operably houses a portion of a pump shaft that is engaged with the rotating vanes to transfer power from a coupled engine to the vanes.

At 506, a one-piece packing gland can be fixedly coupled to the shaft casing. In this method 500, the packing gland can comprise a body comprising a tube portion and a shoulder portion, where the tube portion extends into the packing box surrounding the shaft, and the shoulder portion is disposed external to the proximal end of the packing box. Further, in this method 500, the packing gland can comprise a first channel that disposed inside the tube portion at the proximal end, and a second channel that is disposed distally from the first channel inside the tube portion. Additionally, the packing gland can comprise a third channel that is disposed between the first channel and the second channel in the tube portion. In this method, the third channel is in fluid communication with a lubrication inlet port, and the third channel is operably receiving lubrication fluid through the lubrication inlet port to lubricate the contact between the shaft and the first gasket and the shaft and the second gasket.

In the example method 500, coupling the packing gland to the shaft casing can comprise, at 508, placing a first gasket in the first channel, such that the first gasket is operably in contact with the rotating shaft to mitigate pumped fluid leakage along the shaft. Further, coupling the packing gland to the shaft casing can comprise, at 510, placing a second gasket in the second channel, such that the second gasket is operably in contact with the rotating shaft to mitigate pump fluid leakage along the shaft.

Having coupled the packing gland to the shaft casing, the example method 500 ends at 512.

In some implementations, in this aspect, the packing gland can comprise a fourth channel that is disposed on a distal side of the shoulder portion. In this implementation, the coupling of the one-piece packing gland to the shaft casing can comprise placing a third gasket in the fourth channel, such that the second gasket is operably in contact with the shaft casing to mitigate pumped fluid leakage along the outside of the packing gland.

In some implementations, the method of making the pump can comprise fixedly engaging an indicator fitting to a lubrication outlet port in the shoulder portion of the packing gland that is in fluid communication with the third channel. In this implementation, the indicator fitting can provide an indication of a change in pressure in the third channel, which is indicative of damage to one or more of the first gasket and second gasket. Further, in some implementations, a lubrication fitting can be coupled with the lubrication inlet port to allow lubrication fluid to be injected into the inlet port.

In some implementations, the method of making the pump can comprise disposing a bushing on the shaft adjacent to and proximal from the pumping chamber. In this implementation, the bushing can support the shaft during operation, and the bushing can comprise a lubrication port to receive lubricating fluid at the shaft during operation. Further, in some implementations, packing material can be disposed in the packing box distally from the packing gland such that the packing material mitigates leakage of the pumped fluid.

In some implementations, fixedly coupling the one-piece packing gland to the shaft casing can comprise driving a fastener through a fastener receiver in the shoulder portion of the packing gland into the shaft casing and fastening in place. Further, in some implementations, a bearing assembly can be engaged with the pump shaft proximally from the packing gland, wherein the bearing assembly is disposed in contact with the shaft to provide support to the shaft during operation.

In an alternate aspect, the seal carrier packing gland, described herein, may be utilized with a sleeve that is coupled to the shaft, and rotates with the shaft. As described above, a pump can be coupled to a motor by a rotating shaft. The motor typically rotates the shaft, which, in turn, rotates a pump rotor to move fluids through coupled conduits. The rotating shaft can experience wear at the location of the dynamic seals, which can lead to increased maintenance, repair, and unwanted damage. A system can be devised for sealing a rotating pump shaft entrance to the pumping chamber, while improving the operation at the potential wear point, which can reduce maintenance and improve longevity for the pump. For example, this can provide a life cycle cost advantage for the pump, and can enable the user to easily replace gaskets (e.g., O-rings) sourced locally at a lower cost, over typical molded elastomeric seals, or sending the pump out for repair. Additionally, this design can provide performance advantages over existing lip seal technology, such as enabling higher seal chamber pressures and greater abrasion resistance.

In this aspect, for example, the devised system can provide an improvement over current technology, by eliminating wear from the pump shaft, and utilizing a wear sleeve instead. The shaft, for example, is typically a more expensive component in the pump assembly, and can be cost prohibitive for the customer to replace. Therefore, in this aspect, a sleeve can be operably fixed to the shaft, and it can become the wear point in place of the wear being applied to the shaft. Therefore, for example, when the wear to the sleeve reaches a particular point (e.g., where desired operation is impacted), the sleeve can be replaced instead of the shaft. In this aspect, in one implementation, the sleeve becomes a disposable wear point for the pump, allowing continued operational condition of the pump shaft.

In one implementation, a packing seal gland component can be used to retain two internal dynamic O-rings and one external static O-ring (e.g., packing gland/seal carrier 202). Further, a shaft sleeve can be fixedly engaged with the rotating shaft, for example, with at least one set screw (e.g., or other appropriate fastener), to allow for the sleeve to rotate with the shaft. In this implementation, the internal dynamic seal channels (e.g., O-ring grooves) can be disposed on the packing gland member to compress the gaskets (e.g., O-rings) against the shaft sleeve, which can create a seal against the pumped fluid or processed liquid. In one aspect, the system described herein can help to add appropriate compression to the O-rings between the packing seal gland member and the rotating seal sleeve members, to create an appropriate seal with the O-rings.

Additionally, the packing seal gland member can comprise an internal channel, as described above, to provide a flow path for lubricating fluids to be added internally to the packing seal gland member, such as during operation. In one implementation, the lubricating fluids (e.g., appropriate grease, oil, and other products) can be added to the packing seal gland to lubricate the internal, dynamic gaskets that are running on the rotating seal sleeve. In one implementation, the lubrication can be added through a port in the packing seal gland member to lubricate the dynamic gaskets to increase the life of the gaskets, by decreasing the wear of the sealing components. In one implementation, the lubricant is pressurized to reduce a pressure differential between the pumping chamber and the atmosphere, for example, to reduce stress on the gaskets. As an example, the lubricant may act as a barrier fluid to mitigate escape of fugitive emissions from the pump, and to mitigate intrusion of atmospheric air into the pump when operated under vacuum.

Figure 6A:
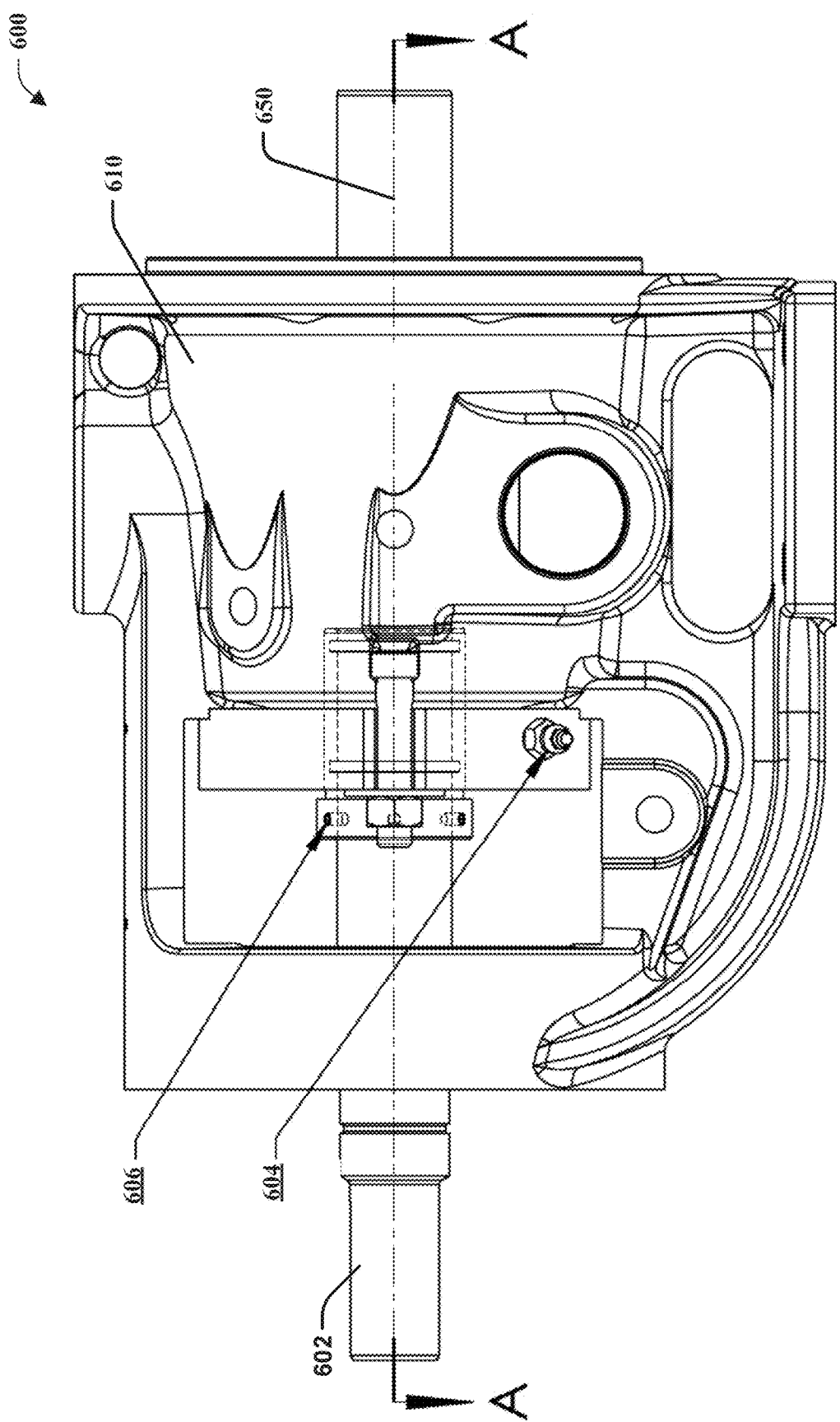

FIGS. 6A, 6B, 6C, and 6D are component diagrams illustrating various views of portions of an example implementation of a pump 600 comprising one or more portions of the systems and devices described herein. In this implementation, as shown in FIGS. 6A and 6B, the example pump 600 comprises a shaft 602 disposed centrally, laterally in the pump 600, along a central axis 650. The shaft 602, for example, can be powered by a separate motor to rotate the shaft and pumping components disposed in the pump housing 610. A packing seal gland 608 can be utilized in the pump 600 to help mitigate fluid loss or leakage from around the shaft 602 of the pump 600 with a rotating shaft driving a pumping mechanism. For example, the location at which the rotating pump shaft enters the pumping chamber (e.g., 364 of FIG. 3), comprising the pump rotor (e.g., 338 of FIG. 3), offers a location for leakage of the pumped fluid from the pumping chamber.

Figure 6C:
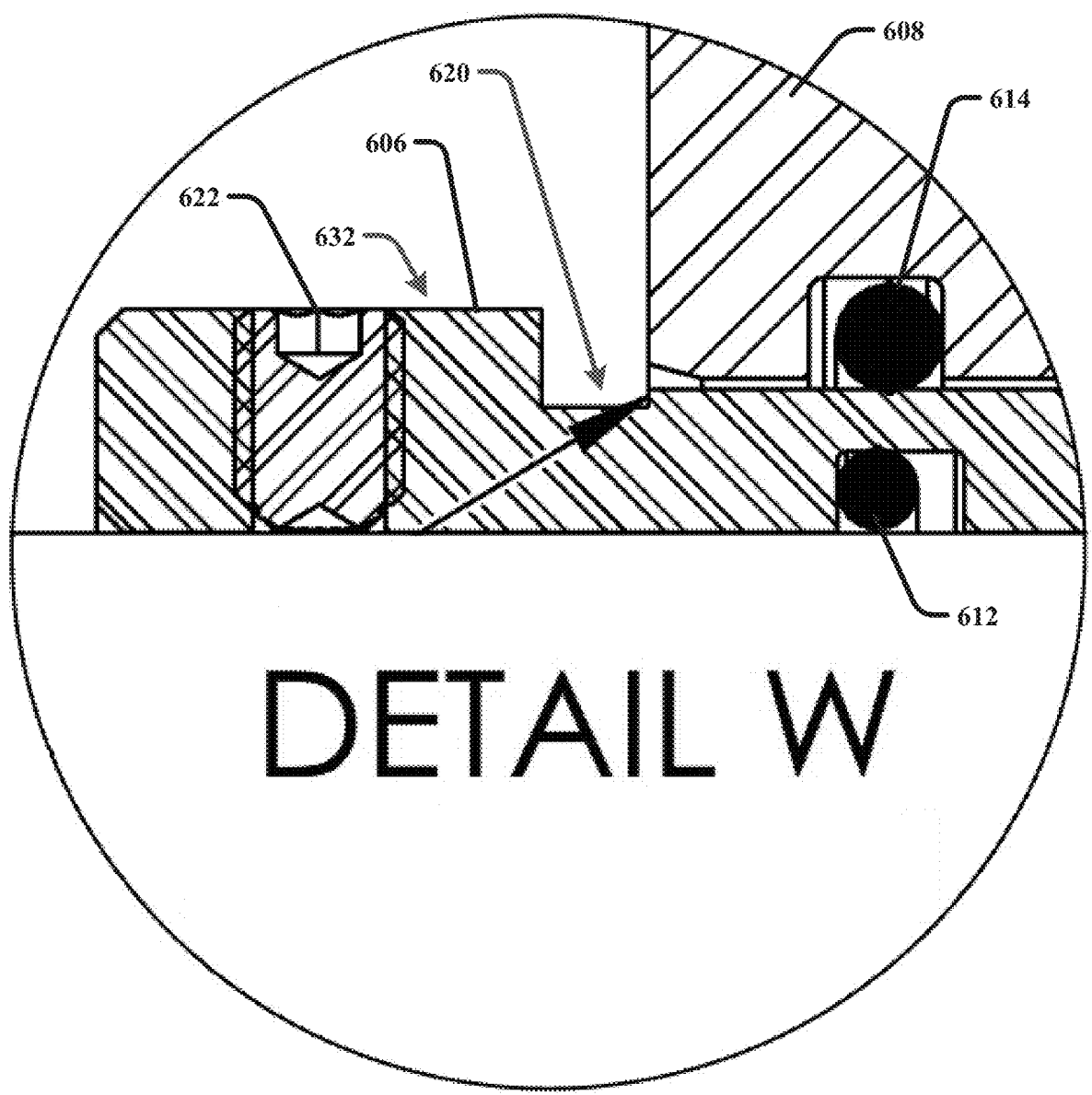
FIGS. 6C and 6D are component diagrams illustrating detailed views of one or more portions of one or more portions of the example pump, described herein.
Figure 6D:
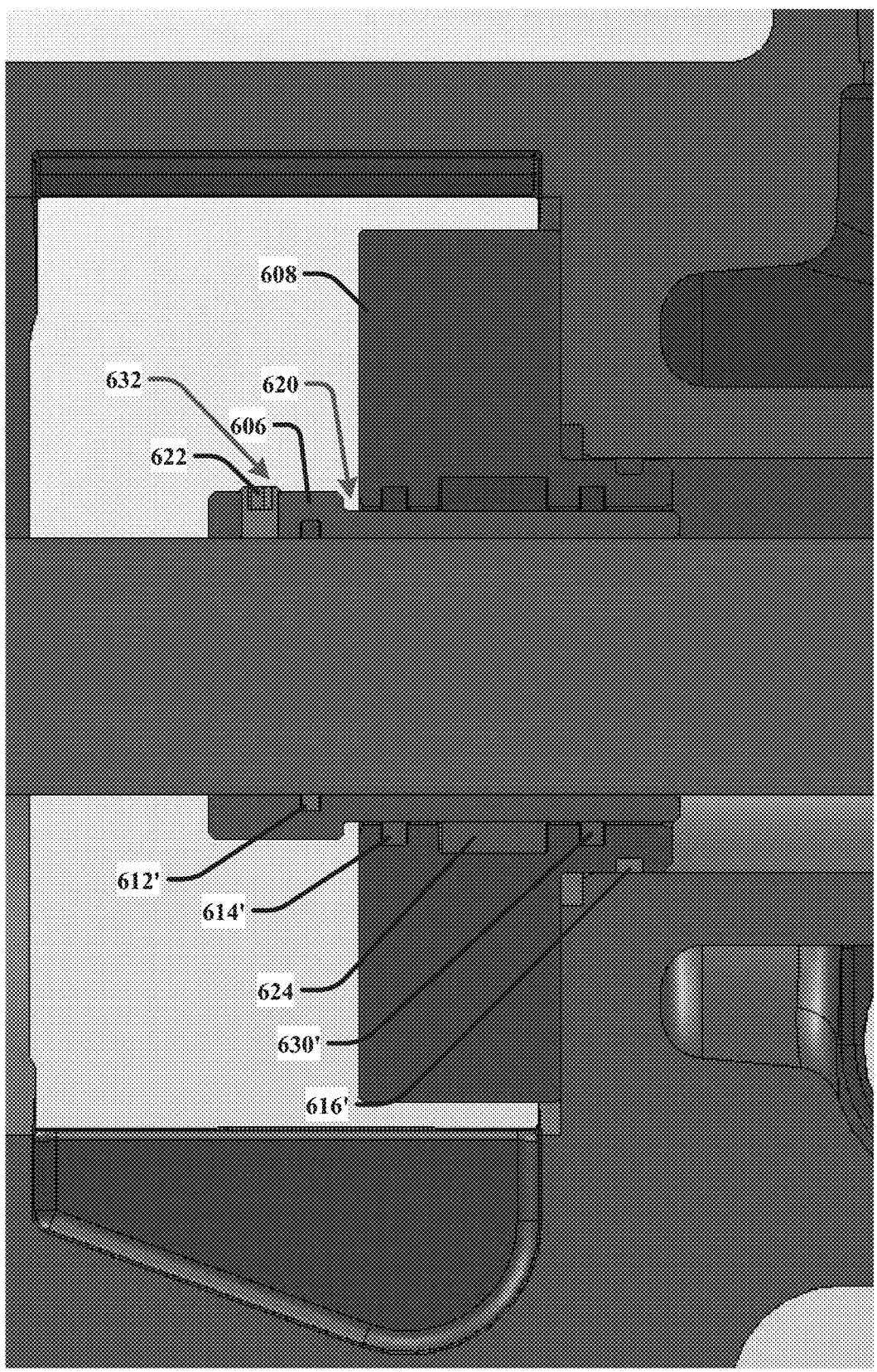

Further, in this implementation, the example, pump 600 can comprise a sleeve 606 that is disposed between the packing seal gland 608 and the shaft 602. As illustrated in FIG. 6C and 6D, the sleeve 606 can be operably, fixedly engaged with the shaft 602 by a fastener 622, such as a set screw or the like. In this implementation, because the sleeve 606 can be fastened to the shaft 602, in operation, the sleeve 606 will rotate with the shaft 602. In this way for example, the sleeve 606 can comprise a replaceable wear point between the shaft 602 and packing seal gland 608, instead of the shaft 602 being worn from the contact with the packing seal gland 608. That is, for example, the sleeve 606 is more easily replaced, and is less costly, than replacing the more costly shaft 602, which is also more difficult to replace.

In this example implementation, the pump 600 can comprise a lubrication fitting 604. For example, a lubricating agent (e.g., dependent upon the application and use of the pump) can be introduced into the packing seal gland 608 through the lubrication fitting 604, and into a port that leads inside the packing seal gland 608. In this way, the lubricating agent can help lubricate potential friction points between the packing seal gland and shaft, such as locations where gaskets, such as O-rings may be disposed.

Further, as illustrated in FIGS. 6B, 6C, and 6D, a first static gasket 612 (e.g., O-Ring) can be disposed in a first gasket channel 612', at a proximal end of the sleeve 606, between the sleeve 606 and the shaft 602. The first static gasket 612 can be used to mitigate leakage of fluid from between the shaft 602 and the sleeve 606. As an example, the first static gasket 612 may serve as a second seal in case a primary seal (e.g., gasket 618) fails. A second dynamic gasket 614 can be disposed in a second gasket channel 614', at a proximal end of the packing seal gland 608 between the packing seal gland 608 and the sleeve 606. The second dynamic gasket can mitigate leakage of fluid from between the packing seal gland 608 and sleeve 606, and can provide a wear and lubrication point between the rotating sleeve 606 and stationary packing seal gland 608. Further, the second dynamic gasket 614 can mitigate leakage of lubrication fluid from the lubrication channel.

A third static gasket 616 can be disposed in a third gasket channel 616', at a distal end of the packing seal gland 608 between the packing seal gland 608 and interior shaft cavity of the pump housing 610 (e.g., the packing box). The third static gasket 616 can be used to mitigate leakage of fluid from between the packing seal gland 608 and interior shaft cavity of the pump housing 610. In one implementation, a fourth static gasket 618, in FIG. 6B, can be disposed in a fourth gasket channel 618' at the distal end of the sleeve 606 between the shaft 602 and the sleeve 606. The fourth gasket can be used to mitigate leakage of fluid from between the shaft 602 and the sleeve 606. In one implementation, a fifth gasket 630 can be disposed in a fifth gasket channel 630', at a distal end of the packing seal gland 608 between the packing seal gland 608 and the sleeve 606. The fifth gasket 630 can mitigate leakage of fluid from between the packing seal gland 608 and sleeve 606, and can provide a wear and lubrication point between the rotating sleeve 606 and stationary packing seal gland 608. For example, the fifth gasket 630 can mitigate leakage of lubrication fluid from the lubrication channel chamber 624, and my mitigate entry of process or pumped fluid along the sleeve 606.

In one implementation, as illustrated in FIGS. 6C and 6D, the sleeve 606 can comprise a groove 620, which is disposed distally from, and adjacent to, a shoulder portion 632 of the sleeve 606. In this implementation, the sleeve 606 can be positioned on the shaft 602, such that the proximal face of the packing seal gland 608 is disposed substantially flush with the edge of the groove 620 of the sleeve 606. Further, the shoulder portion 632 of the sleeve 606 can comprise a diameter that is larger than the diameter of the sleeve 606 distal from the shoulder portion 632. That is, for example, the diameter of the sleeve 606 disposed inside the packing seal gland 608 can have a smaller diameter than the shoulder portion 632 of the sleeve 606, which is disposed outside of the packing seal gland 608.

Additionally, in one implementation, the packing seal gland 608 can comprise a lubrication channel chamber 624. The lubrication chamber 624 can be fluidly coupled with a port that is operably coupled with the lubrication fitting 604. As an example, the lubrication agent (e.g., fluid) can be introduced through the lubrication fitting 604, and into the lubrication chamber 624 through the port. The lubrication chamber 624 can comprise a sort of lubricant reservoir for the lubrication agent. In one implementation, the packing seal gland 608 can comprise one or more channels that lead from the lubrication chamber 624 along the length of the packing seal gland 608 to provide lubrication to the rotating sleeve 606.

In one aspect, the sleeve 606 can be subject to wear as it rotates with the shaft inside the packing seal gland 608. In this aspect, for example, as the sleeve 606 becomes worn, wear points may provide locations for fluid to leak from between the packing seal gland 608 and the sleeve 606, such as along the shaft 602 from the pumping chamber. In this aspect, for example, wearing down the sleeve 606 may be preferable to wearing down the shaft 602, if the sleeve was not present (e.g., as is system 300 of FIG. 3). For example, the sleeve 606 may more easily be replaced than the shaft 602. That is, in this example, the sleeve 606 can be replaced without disassembling the pump, which cannot be done if the shaft 602 was replaced. Further, for example, a replacement sleeve 606 is less costly than a replacement shaft 602. Therefore, both time and money can be saved by using the sleeve 606 as disclosed herein. Further, in one implementation, in this aspect, the diameter of the internal chamber of the packing seal gland 608 may need to be larger in order to accommodate the sleeve 606 (e.g., compared to the packing gland 202 of system 300 in FIG. 3). That is, for example, a pump without a sleeve will have an internal chamber (e.g., packing box 360 of FIG. 3) for a packing gland with a smaller diameter than the packing seal gland 608 that utilizes the sleeve 606.

In one implementation, the sleeve 606 can be configured to be disposed on the shaft 602 in a plurality of locations. For example, the configuration of the sleeve 606 allows for multi-positioning of the sleeve on the shaft. In this way, for example, instead of replacing the sleeve 606 when sufficient wear is detected, the sleeve may merely be moved to a different position on the shaft 602. As described above, the sleeve 606 may become worn at wear points, such as where the sleeve 606 and packing seal gland 608 are engaged, with one or more O-rings between. In this implementation, for example, the sleeve 606 can be moved to a different position, such that the wear points are no longer at the position of the contact with the O-rings, which can provide a new seal point between the sleeve 606 (and O-rings) and the packing seal gland 608. In this way, for example, the sleeve 606 may have an extended life, as it can be used several times by merely moving its position along the shaft 602. Further, the groove 620 of the sleeve 606, for example, can aid in initial and secondary positioning the sleeve in relation to gland 608. That is, for example the positioning of the sleeve 606 within the gland 608 can be aligned using the groove 620.

Figure 7A:
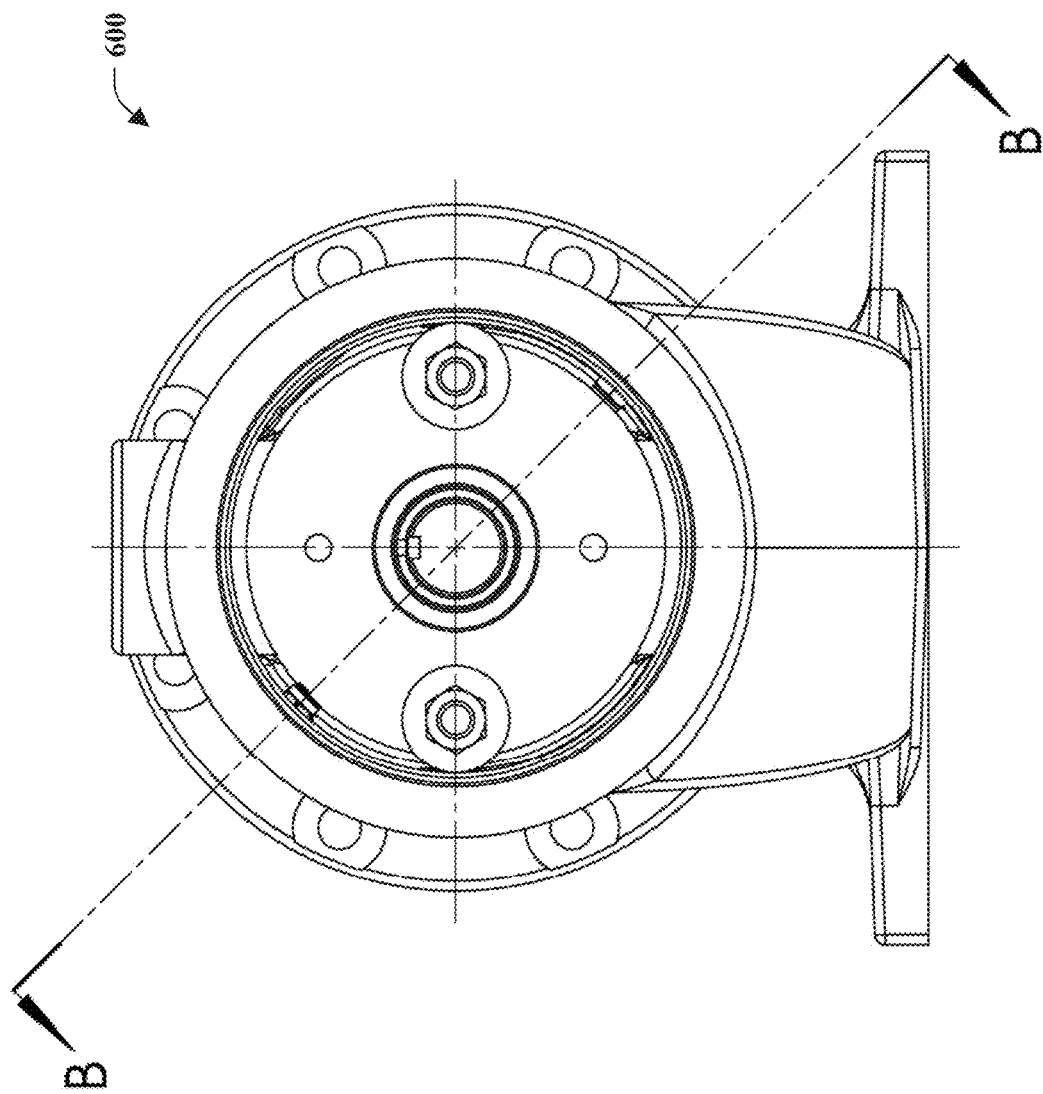
FIGS. 7A and 7B are component diagrams illustrating a rear view and cut-away view of an example pump.
Figure 7B:
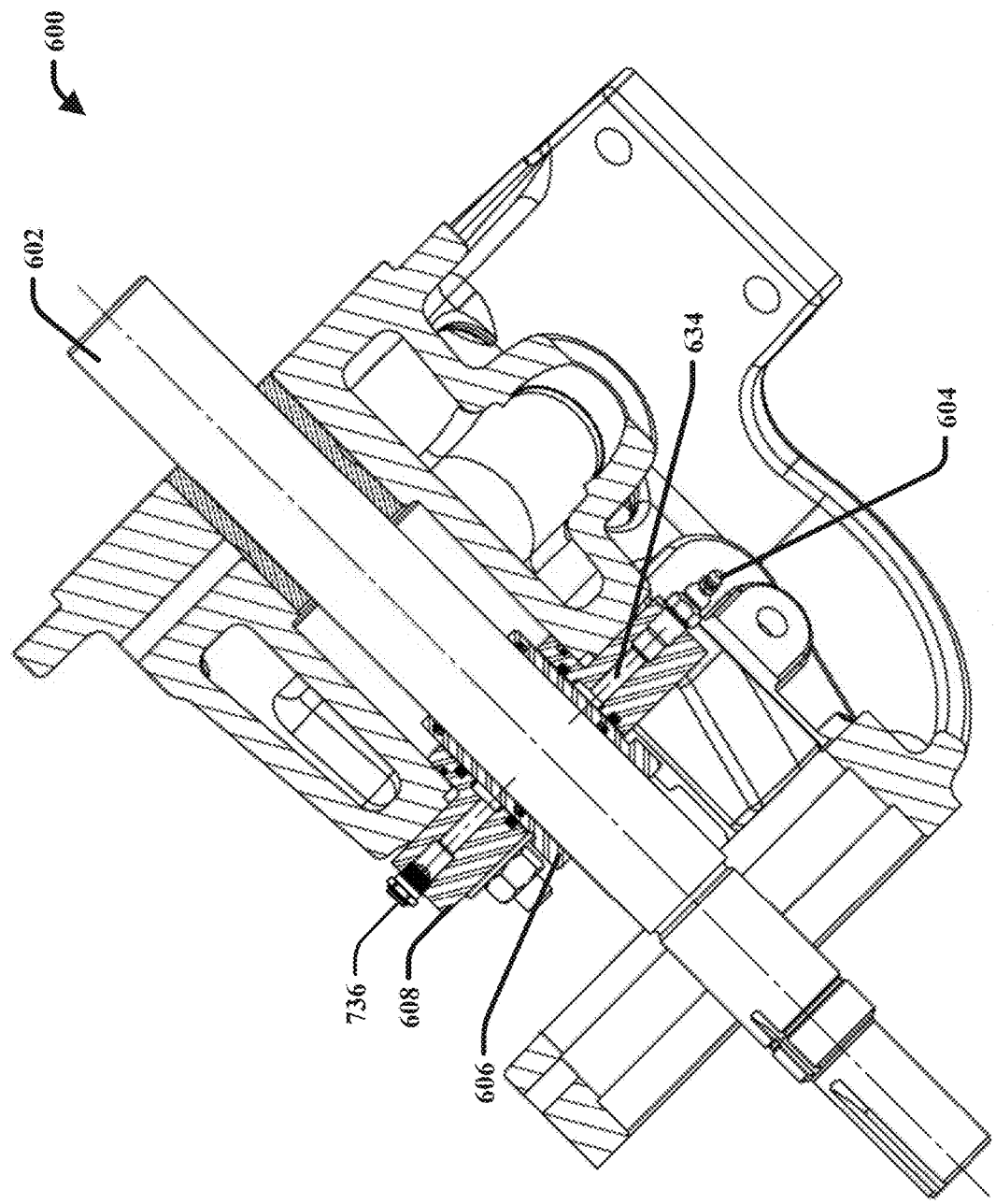

FIG. 7A is a component diagram of a rear view of the example, pump; and FIG. 7B is a cross-section of the pump 600, shown as B-B. As illustrated, the example pump 600 comprises a lubricant pressure relief fitting 736, which leads to a lubricant port 634. In one implementation, the lubricant pressure relief fitting 736 can provide pressure relief, such as when/if one of the O-rings is damaged, allowing the lubricant to be drawn into the area of the sleeve, and to provide a visual indication that an O-ring has been damaged (e.g., blown-out). As one example, the pressure relief fitting 736 can allow the lubrication chamber (e.g., 624, FIG. 6D) to be pressurized higher than the pump's operating pressure. In this example, if one or more of the O-rings fail, the lubrication media can migrate into the pumping chamber. Further, as described above, the lubricant fitting 604 can lead to the lubricant port 634. In one implementation, the lubricant port 634 can provide lubricant to the lubricant chamber 624, to provide lubrication to the O-rings and engagement point between the packing seal gland 608 and the sleeve 606.

Figure 8:
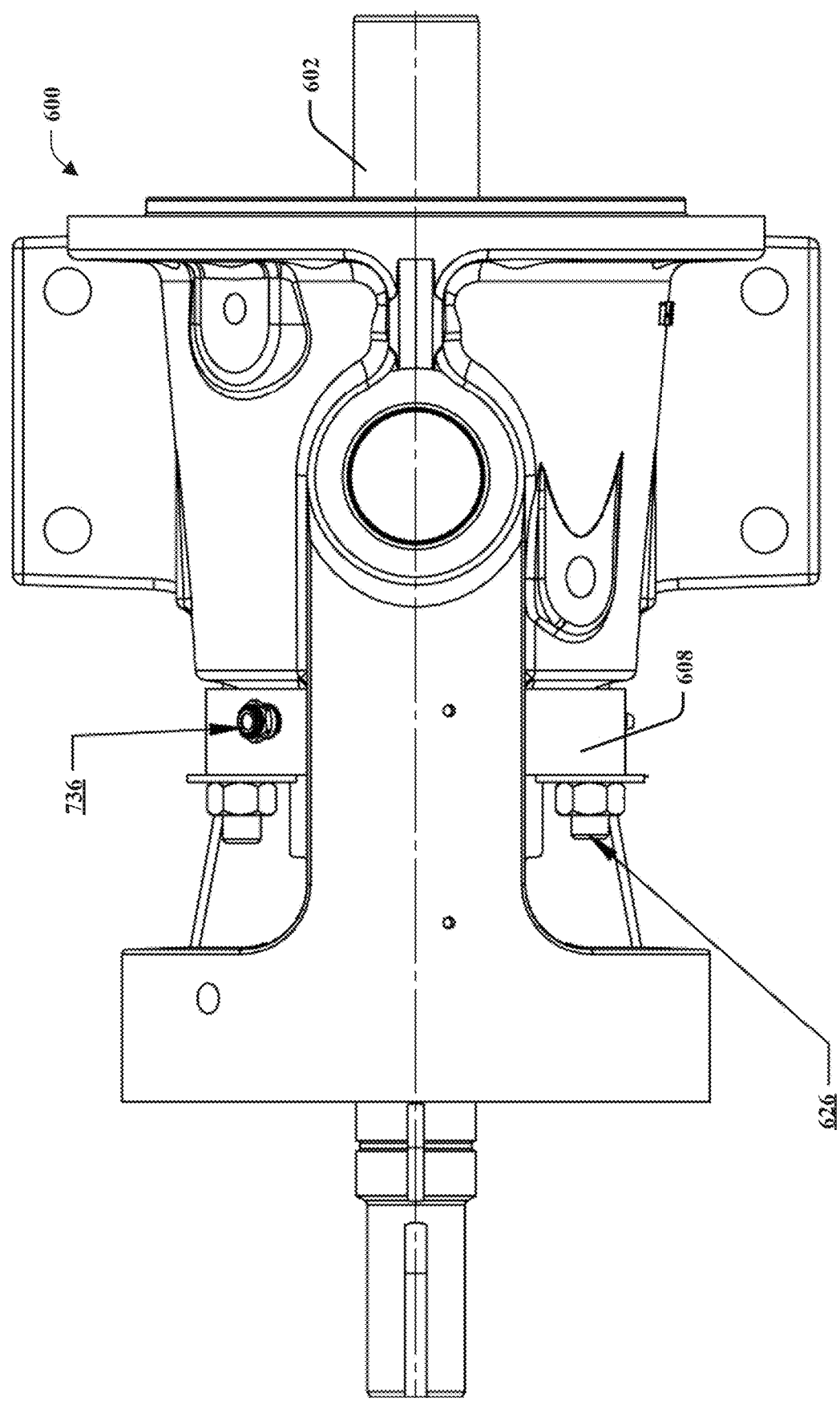
FIGS. 8, 9 and 10 are component diagrams illustrating various views of an example implementation of a pump as described herein.
Figure 9:
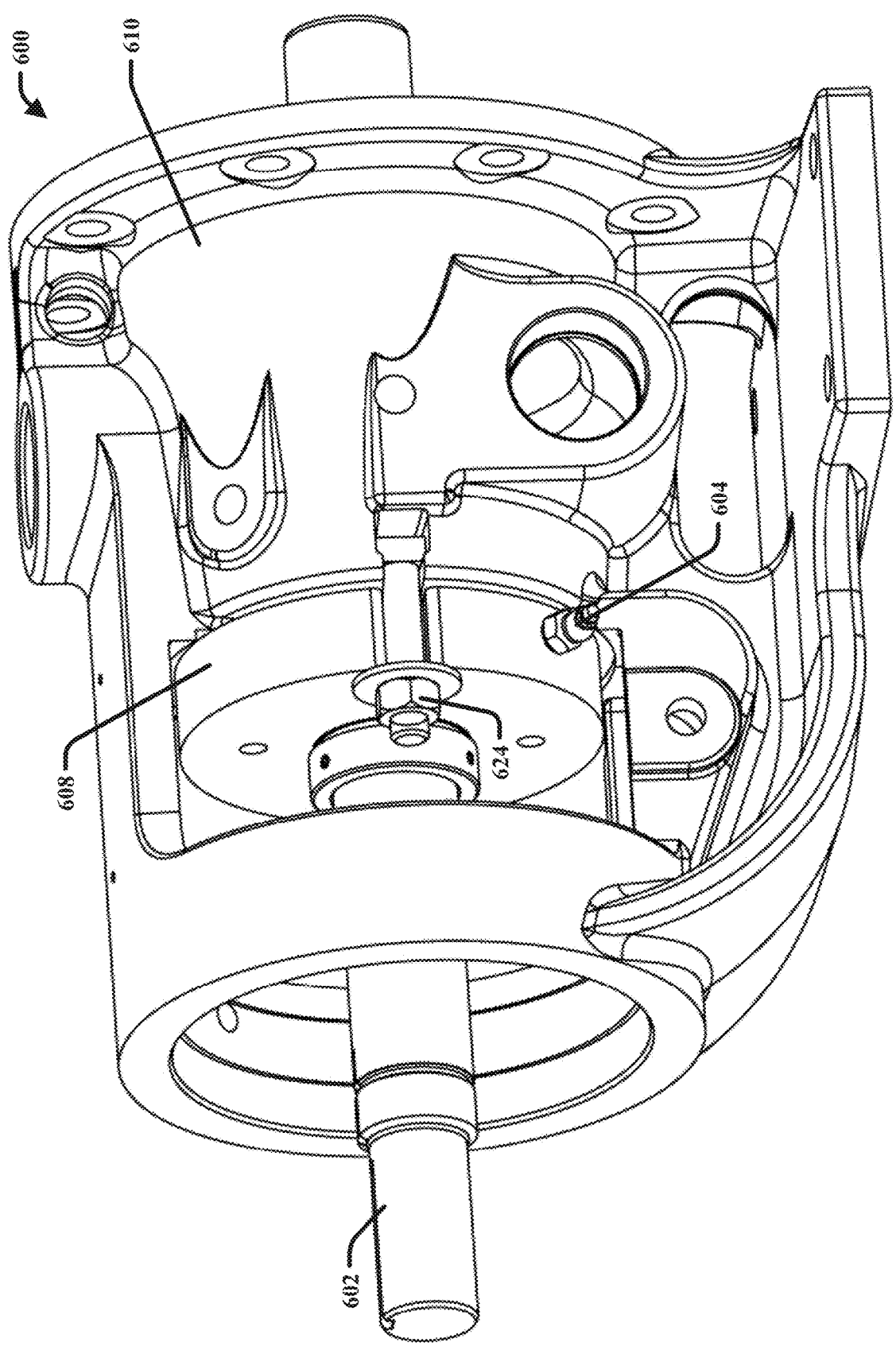
Figure 10:
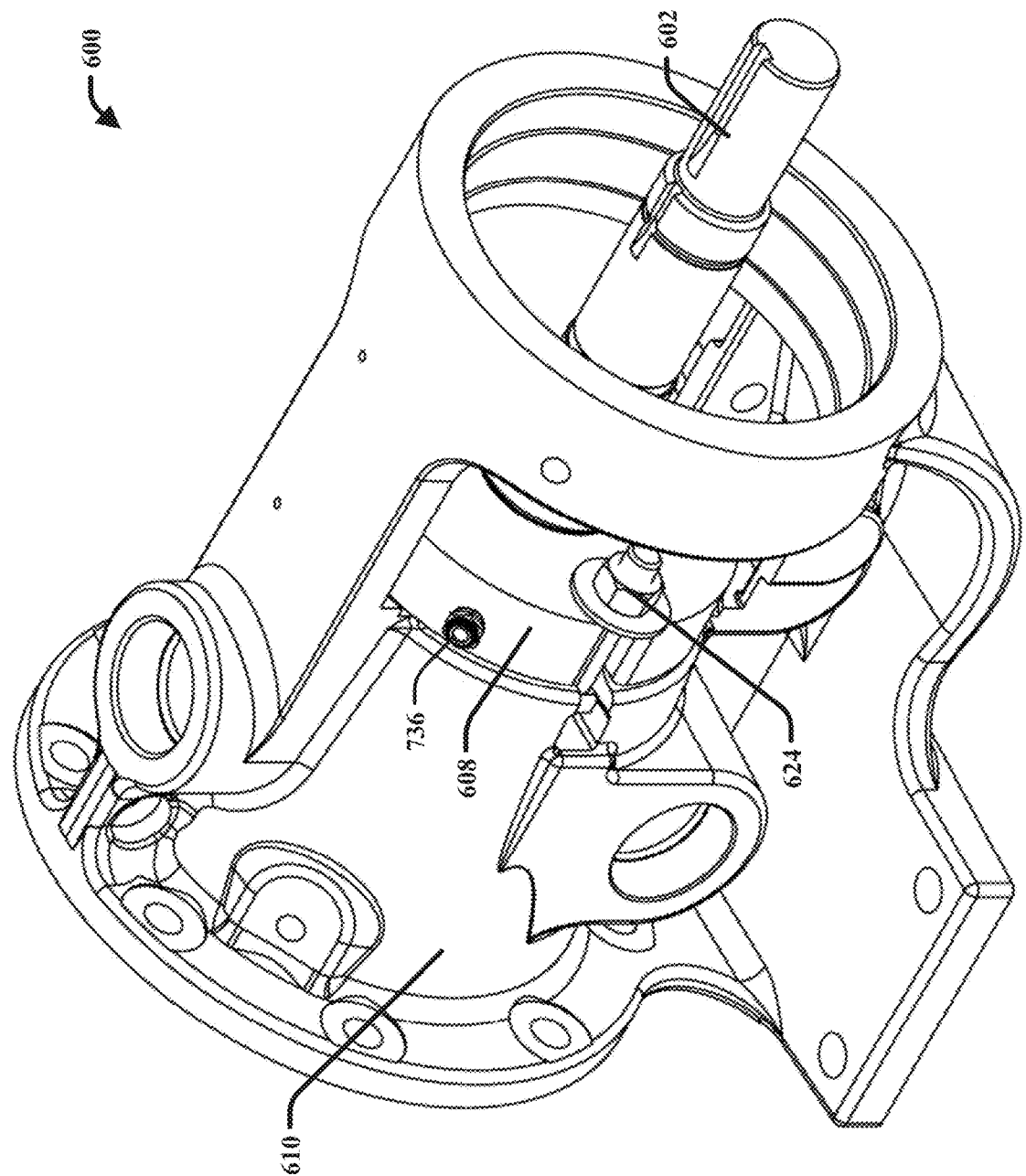

FIG. 8 is a component diagram illustrating a top view of the example, pump 600. In this implementation, the pump 600 can comprise one or more packing gland fasteners 626. The packing gland fasteners 626 can be used to fasten the packing seal gland 608 to the pump housing 610, and to tighten the packing seal gland 608 to a desired compression (e.g., to compress packing material and/or mitigate leaks). FIGS. 9 and 10 are component diagrams illustrating perspective views of the example pump 600. As illustrated, the pump comprises the housing 610, shaft 602, packing seal gland 608, packing gland fastener(s) 624, the lubricant fitting 604, and the lubricant pressure relief fitting 736.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A pump, comprising:
   a pumping chamber disposed at a distal end of the pump, comprising rotating vanes;
   a pump shaft engaged with the rotating vanes to transfer rotation power from a coupled engine to the vanes;
   a shaft casing comprising a packing box that operably houses a portion of the pump shaft adjacent to the pumping chamber; and
   a one-piece packing gland comprising a body, the body comprising a tube portion and a shoulder portion, the tube portion extending into the packing box surrounding the shaft, and the shoulder portion disposed external to the proximal end of the packing box, the packing gland comprising:
      a first channel disposed inside the tube portion at the proximal end, the first channel housing a first gasket that is operably in contact with the rotating shaft to mitigate pumped fluid leakage along the shaft;
      a second channel disposed distally from the first channel inside the tube portion, the second channel housing a second gasket that is operably in contact with the rotating shaft to mitigate pumped fluid leakage along the shaft; an-GI
      a third channel disposed between the first channel and the second channel in the tube portion, the third channel in fluid communication with a lubrication inlet port, the third channel operably receiving lubrication fluid through the lubrication inlet port to lubricate the contact between the shaft and the first gasket and the shaft and the second gasket; and
      the packing gland comprising a lubrication outlet port in fluid communication with the third channel to allow lubrication fluid to exit the third channel;
   wherein the packing gland is selectably, operably fastened to the shaft casing.

2. The pump of claim 1, the packing gland comprising a fourth channel disposed on a distal side of the shoulder portion, the fourth channel operably housing a third gasket to mitigate pumped fluid leakage along the outside of the packing gland.

3. The pump of claim 1, the outlet port comprising an indicator fitting that indicates a change in pressure in the third channel, indicative of damage to one or more of the first gasket and second gasket.

4. The pump of claim 1, the inlet port in fluid communication with the proximal side of the shoulder portion.

5. The pump of claim 1, comprising packing material disposed in the packing box between the shaft and the shaft casing distally from the packing gland to mitigate leakage of the pumped fluid.

6. The pump of claim 1, comprising a bushing disposed between the shaft and the shaft casing distally from the packing gland to support the shaft during operation, the bushing comprising a lubrication port to receive lubricating fluid at the shaft during operation.

7. The pump of claim 1, the packing gland comprising one or more of the following chamfers:
   a first chamfer disposed at the proximal end of the tube portion;
   a second chamfer disposed at the distal end of an external side of the tube portion; and
   a third chamfer disposed at the distal end of an internal side of the tube portion.

8. The pump of claim 1, the packing gland comprising two or more fastener receivers disposed in the shoulder portion respectively to receive a fastener to selectably fasten the packing gland to the shaft casing.

9. The pump of claim 1, comprising a lubrication fitting selectably engaged with the lubrication inlet port to allow lubrication fluid to be injected into the inlet port.

10. A pump, comprising:
    pump housing comprising a packing chamber;
    a shaft rotating within the pump housing inside the packing chamber;
    a packing seal gland operably, fixedly engaged with the pump housing, and having an internal opening through which the shaft is operably disposed, at least a portion of the packing seal gland disposed inside the packing chamber, the packing seal gland comprising:
       a body comprising a tube portion and a shoulder portion, the tube portion extending into the packing box surrounding the shaft, and the shoulder portion disposed external to the proximal end of the packing chamber;
       a lubrication channel chamber configured as a lubricant chamber that is disposed in the tube portion, the lubrication channel chamber in fluid communication with a lubrication inlet port and a separate lubrication outlet port;
    a sleeve operably, selectably fixedly engaged with the shaft, at least a portion of the sleeve is disposed inside the packing seal gland internal opening such that the sleeve rotates inside the seal gland.

11. The pump of claim 10, the packing seal gland comprising a second channel disposed inside the tube portion distally from the first channel, the second channel housing a second gasket that is operably in contact with the rotating sleeve to mitigate pumped fluid leakage along the sleeve.

12. The pump of claim 11, the packing seal gland comprising a third channel disposed distally from the first channel inside the tube portion, the third channel housing a third gasket that is operably in contact with the rotating sleeve to mitigate pumped fluid leakage along the sleeve.

13. The pump of claim 10, the lubricant chamber is disposed between the second channel and the fifth channel in the tube portion.

14. The pump of claim 10, comprising a fastener that operably fixedly engages the sleeve to the rotating shaft.

15. The pump of claim 10, the sleeve comprising a first channel disposed at a proximal end of the sleeve, housing a first dynamic gasket between the sleeve and the shaft, to mitigate leakage of fluid from between the shaft and the sleeve.

16. The pump of claim 10, the sleeve comprising a fourth channel disposed at a distal end of the sleeve, housing a fourth static gasket between the sleeve and the shaft, to mitigate leakage of fluid from between the shaft and the sleeve.

17. The pump of claim 10, the sleeve comprising a groove disposed distally from, and adjacent to, a shoulder portion of the sleeve, the shoulder portion of the sleeve having a diameter larger than a diameter of the sleeve.

18. A packing gland used in a pump to mitigate leakage from the pump, comprising:
    a body, the body comprising a tube portion and a shoulder portion, the tube portion extending along a central axis, and comprising an inner diameter configured to receive a rotating shaft of a pump, and an external diameter configured to fit inside a packing box of the pump, the shoulder portion extending perpendicular to the central axis from a proximal end of the body, and configured to be disposed external to the proximal end of the packing box of the pump, the packing gland comprising:
- a first channel disposed inside the tube portion at the proximal end;
- a second channel disposed distally from the first channel inside the tube portion;
- a third channel disposed between the first channel and the second channel inside the tube portion, the third channel in fluid communication with a lubrication inlet port and lubrication outlet port, the respective ports in fluid communication with the third channel to operably receive lubrication fluid through the lubrication inlet port to lubricate the contact between the shaft and the first gasket and the shaft and the second gasket;
- a fourth channel disposed on a distal side of the shoulder portion; and
- two or more fastener receivers disposed in the shoulder portion respectively to receive a fastener to selectably fasten the packing gland to a shaft casing of the pump;
- a first gasket disposed in the first channel such that the first gasket is operably in contact with the rotating shaft of the pump to mitigate pumped fluid leakage along the shaft;
- a second gasket disposed in the second channel such that the second gasket is operably in contact with the rotating shaft of the pump to mitigate pumped fluid leakage along the shaft;
- a third gasket disposed in the fourth channel such that the third gasket is operably in contact with the shaft casing of the pump to which the packing gland is fixedly coupled, to mitigate pumped fluid leakage along the outside of packing gland;
- a fluid inlet fitting operably engaged with the lubrication inlet port and configured to allow injection of lubrication fluid into the third channel; and
- an indicator fitting operably coupled with the lubrication outlet port to indicate a change in pressure in the third channel, indicative of damage to one or more of the first gasket and second gasket.

* * * * *